US011034830B2

(12) United States Patent
Janoski et al.

(10) Patent No.: US 11,034,830 B2
(45) Date of Patent: Jun. 15, 2021

(54) ACRYLIC POLYVINYL ACETAL FILMS COMPRISING A SECOND LAYER

(71) Applicant: 3M INNOVATIVE PROPERTIES COMPANY, St. Paul, MN (US)

(72) Inventors: Jonathan E. Janoski, Woodbury, MN (US); Carla S. Thomas, Woodbury, MN (US); Anthony F. Schultz, Forest Lake, MN (US); Tien Y. H. Whiting, St. Paul, MN (US); Kevin M. Lewandowski, Inver Grove Heights, MN (US); Duane D. Fansler, Dresser, WI (US); Keith R. Lyon, Hudson, WI (US); Arlin L. Weikel, Mansfield, PA (US); Timothy J. Hebrink, Scandia, MN (US); Amanda K. Hulke, St. Louis Park, MN (US); Eric D. Shockey, Stillwater, MN (US); Anthony M. Renstrom, Forest Lake, MN (US); Sonja S. Mackey, St. Paul, MN (US); Thomas P. Klun, Lakeland, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 61 days.

(21) Appl. No.: 15/777,686

(22) PCT Filed: Dec. 13, 2016

(86) PCT No.: PCT/US2016/066309
§ 371 (c)(1),
(2) Date: May 21, 2018

(87) PCT Pub. No.: WO2017/112453
PCT Pub. Date: Jun. 29, 2017

(65) Prior Publication Data
US 2018/0346705 A1    Dec. 6, 2018

Related U.S. Application Data

(60) Provisional application No. 62/346,833, filed on Jun. 7, 2016, provisional application No. 62/270,750, filed on Dec. 22, 2015.

(51) Int. Cl.
*C08L 33/10* (2006.01)
*B32B 27/08* (2006.01)
(Continued)

(52) U.S. Cl.
CPC .............. *C08L 33/10* (2013.01); *B32B 5/022* (2013.01); *B32B 5/024* (2013.01); *B32B 5/18* (2013.01); *B32B 5/245* (2013.01); *B32B 5/26* (2013.01); *B32B 7/02* (2013.01); *B32B 7/12* (2013.01); *B32B 15/046* (2013.01); *B32B 15/082* (2013.01); *B32B 15/12* (2013.01); *B32B 15/14* (2013.01); *B32B 23/08* (2013.01); *B32B 23/20* (2013.01); *B32B 23/22* (2013.01); *B32B 27/065* (2013.01); *B32B 27/08* (2013.01); *B32B 27/10* (2013.01); *B32B 27/12* (2013.01); *B32B 27/20* (2013.01); *B32B 27/28* (2013.01); *B32B 27/283* (2013.01); *B32B 27/285* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 27/40* (2013.01); *B32B 27/42* (2013.01); *B32B 29/007* (2013.01); *B32B 29/02* (2013.01); *C08J 5/18* (2013.01); *C08J 7/0427* (2020.01); *C08L 29/14* (2013.01); *C08L 33/08* (2013.01);
(Continued)

(58) Field of Classification Search
CPC ....... B32B 3/30; B32B 27/308; B32B 27/306; B32B 23/08; B32B 15/082; B32B 5/26; B32B 27/08; C08L 33/10; C08L 29/14
See application file for complete search history.

(56) References Cited

U.S. PATENT DOCUMENTS

| 2,736,721 A | 2/1956 | Dexter |
| RE24,906 E | 12/1960 | Ulrich |

(Continued)

FOREIGN PATENT DOCUMENTS

| CN | 1575099 | 2/2005 |
| CN | 101817975 | 9/2010 |

(Continued)

OTHER PUBLICATIONS

Nakada—JP S64-1737 A—MT—polyvinyl acetal+acrylate resin—1989 (Year: 1989).*
Miyake—JP 2000-247014 A—MT—acrylic+polyvinyl acetal+filler—2000 (Year: 2000).*
Biodegradable Polymeric Materials—Tg caprolactone—2001 (Year: 2001).*

(Continued)

*Primary Examiner* — Callie E Shosho
*Assistant Examiner* — John Vincent Lawler
(74) *Attorney, Agent, or Firm* — Carolyn A. Fischer

(57) ABSTRACT

A film is described comprising a first film layer having a Tg ranging from 30° C. to 60° C. The first film layer comprises a (meth)acrylic polymer and polyvinyl acetal polymer composition. The film further comprises a second layer proximate the first film layer. The second layer is different than the first film layer. The second may be a cured (meth)acrylic polymer film or coating; a backing such as thermoplastic polymer, woven or nonwoven fabrics, metal foils, paper, foams; or a coverfilm such as a fluoropolymer.

20 Claims, No Drawings

(51) Int. Cl.

| | | |
|---|---|---|
| *B32B 27/30* | (2006.01) | |
| *B32B 27/20* | (2006.01) | |
| *B32B 27/10* | (2006.01) | |
| *B32B 27/32* | (2006.01) | |
| *B32B 15/082* | (2006.01) | |
| *B32B 27/36* | (2006.01) | |
| *B32B 5/02* | (2006.01) | |
| *C08L 43/04* | (2006.01) | |
| *B32B 15/14* | (2006.01) | |
| *B32B 27/06* | (2006.01) | |
| *B32B 29/02* | (2006.01) | |
| *B32B 15/04* | (2006.01) | |
| *B32B 15/12* | (2006.01) | |
| *B32B 23/22* | (2006.01) | |
| *B32B 5/18* | (2006.01) | |
| *B32B 27/40* | (2006.01) | |
| *C08L 33/08* | (2006.01) | |
| *B32B 27/42* | (2006.01) | |
| *B32B 27/28* | (2006.01) | |
| *B32B 27/34* | (2006.01) | |
| *B32B 23/08* | (2006.01) | |
| *B32B 5/24* | (2006.01) | |
| *B32B 27/12* | (2006.01) | |
| *B32B 23/20* | (2006.01) | |
| *B32B 29/00* | (2006.01) | |
| *B32B 5/26* | (2006.01) | |
| *B32B 7/02* | (2019.01) | |
| *B32B 7/12* | (2006.01) | |
| *C08J 7/04* | (2020.01) | |
| *C08J 5/18* | (2006.01) | |
| *C08L 29/14* | (2006.01) | |

(52) U.S. Cl.
CPC ............ *C08L 43/04* (2013.01); *B32B 2255/10* (2013.01); *B32B 2255/20* (2013.01); *B32B 2255/205* (2013.01); *B32B 2255/26* (2013.01); *B32B 2262/0253* (2013.01); *B32B 2262/0261* (2013.01); *B32B 2262/04* (2013.01); *B32B 2262/062* (2013.01); *B32B 2262/101* (2013.01); *B32B 2262/105* (2013.01); *B32B 2264/02* (2013.01); *B32B 2264/10* (2013.01); *B32B 2264/101* (2013.01); *B32B 2264/102* (2013.01); *B32B 2264/104* (2013.01); *B32B 2264/105* (2013.01); *B32B 2264/107* (2013.01); *B32B 2264/108* (2013.01); *B32B 2270/00* (2013.01); *B32B 2307/4026* (2013.01); *B32B 2307/41* (2013.01); *B32B 2307/412* (2013.01); *B32B 2307/416* (2013.01); *B32B 2307/518* (2013.01); *B32B 2307/54* (2013.01); *B32B 2307/748* (2013.01); *B32B 2307/756* (2013.01); *B32B 2405/00* (2013.01); *B32B 2419/00* (2013.01); *B32B 2451/00* (2013.01); *B32B 2590/00* (2013.01); *B32B 2605/00* (2013.01); *C08J 2329/14* (2013.01); *C08J 2333/10* (2013.01); *C08J 2429/14* (2013.01); *C08J 2433/10* (2013.01); *C08J 2483/04* (2013.01); *C08L 2205/03* (2013.01)

(56) References Cited

U.S. PATENT DOCUMENTS

| | | |
|---|---|---|
| 3,250,808 A | 5/1966 | Moore |
| 3,277,091 A | 10/1966 | Schmelzer et al. |
| 3,591,531 A | 7/1971 | Schroeder |
| 3,661,588 A | 5/1972 | Chang |
| 3,691,140 A | 9/1972 | Silver |
| 3,929,934 A | 12/1975 | Moore |
| 4,000,356 A | 12/1976 | Weisgerber |
| 4,181,752 A | 1/1980 | Martens |
| 4,243,500 A | 1/1981 | Glennon |
| 4,330,590 A | 5/1982 | Vesley |
| 4,418,120 A | 11/1983 | Kealy |
| 4,737,577 A | 4/1988 | Brown |
| 4,833,179 A | 5/1989 | Young |
| 4,855,184 A | 8/1989 | Klun |
| 4,894,259 A | 1/1990 | Kuller |
| 4,968,562 A | 11/1990 | Delgado |
| 4,994,322 A | 2/1991 | Delgado |
| 5,102,731 A | 4/1992 | Takimoto |
| 5,141,790 A | 8/1992 | Calhoun |
| 5,209,971 A | 5/1993 | Babu |
| 5,214,100 A | 5/1993 | Abele |
| 5,296,277 A | 3/1994 | Wilson |
| 5,362,516 A | 11/1994 | Wilson |
| 5,461,134 A | 10/1995 | Leir |
| 5,506,279 A | 4/1996 | Babu |
| 5,623,010 A | 4/1997 | Groves |
| 5,677,376 A | 10/1997 | Groves |
| 5,820,957 A | 10/1998 | Schroeder |
| 5,902,836 A | 5/1999 | Bennett |
| 6,113,679 A | 9/2000 | Adkins et al. |
| 6,200,666 B1 | 3/2001 | Christian |
| 6,232,359 B1 | 5/2001 | Christian |
| 6,319,985 B1 | 11/2001 | Bruning |
| 6,423,381 B1 | 7/2002 | Colton |
| 6,498,202 B1 | 12/2002 | Sun |
| 6,576,396 B1 | 6/2003 | Leichsenring |
| 6,660,388 B2 | 12/2003 | Liu |
| 6,664,020 B1 | 12/2003 | Warner |
| 6,778,240 B2 | 8/2004 | Nakamura et al. |
| 6,806,320 B2 | 10/2004 | Everaerts |
| 6,881,458 B2 | 4/2005 | Ludwig |
| 7,012,746 B2 * | 3/2006 | Bermel ............... B29C 48/35 359/485.03 |
| 7,072,333 B2 | 7/2006 | Ahn |
| 7,101,618 B2 | 9/2006 | Coggio |
| 7,173,778 B2 | 2/2007 | Jing |
| 7,385,020 B2 | 6/2008 | Anderson |
| 7,416,763 B2 | 8/2008 | Kanda |
| 7,473,462 B2 | 1/2009 | Coggio |
| 7,718,264 B2 | 5/2010 | Klun |
| 8,372,517 B2 | 2/2013 | Tokuchi |
| 8,455,099 B2 | 6/2013 | Chevalier |
| 8,568,849 B2 | 10/2013 | Shi |
| 8,628,855 B2 | 1/2014 | Hao |
| 8,634,146 B2 | 1/2014 | David |
| 9,175,181 B2 | 11/2015 | Butler et al. |
| 9,447,218 B2 | 9/2016 | Mikayama |
| 9,969,911 B2 | 5/2018 | Nakada |
| 2003/0111519 A1 | 6/2003 | Kinney |
| 2003/0224150 A1 | 12/2003 | Ludwig |
| 2004/0077775 A1 | 4/2004 | Audenaert |
| 2004/0253534 A1 | 12/2004 | Kidnie |
| 2004/0260020 A1 | 12/2004 | Miyake |
| 2005/0003222 A1 | 1/2005 | Everaerts |
| 2005/0130425 A1 | 6/2005 | Kanda |
| 2005/0181943 A1 | 8/2005 | Kidnie |
| 2007/0032587 A1 | 2/2007 | Nakashima |
| 2007/0148600 A1 | 6/2007 | Hasegawa |
| 2008/0000583 A1 | 1/2008 | Steelman |
| 2009/0015926 A1 * | 1/2009 | Iwata ............... G02B 1/105 359/601 |
| 2009/0017313 A1 | 1/2009 | Outlaw |
| 2009/0053448 A1 | 2/2009 | Paiva |
| 2010/0015400 A1 * | 1/2010 | Tokuchi ............... B32B 27/30 428/172 |
| 2010/0055418 A1 | 3/2010 | Takamatsu |
| 2010/0058656 A1 | 3/2010 | Chevalier |
| 2010/0154000 A1 | 6/2010 | Macrae |
| 2011/0034618 A1 | 2/2011 | Register |
| 2011/0076613 A1 | 3/2011 | Yoshida |
| 2011/0112247 A1 | 5/2011 | Tokuchi |
| 2011/0282000 A1 | 11/2011 | Hayes |

(56) References Cited

U.S. PATENT DOCUMENTS

| | | | |
|---|---|---|---|
| 2012/0003468 A1 | 1/2012 | Husemann | |
| 2012/0231269 A1 | 9/2012 | Nakagawa | |
| 2012/0260975 A1 | 10/2012 | Gerard | |
| 2012/0288692 A1 | 11/2012 | Broyles | |
| 2013/0004766 A1 | 1/2013 | Abe | |
| 2013/0310509 A1 | 11/2013 | Hannemann | |
| 2014/0030538 A1 | 1/2014 | Boutillier | |
| 2014/0154505 A1 | 6/2014 | Steelman | |
| 2015/0175458 A1 | 6/2015 | Momiyama | |
| 2015/0240067 A1 * | 8/2015 | Nagai | C08F 261/12 525/221 |
| 2016/0053039 A1 | 2/2016 | Mikayama et al. | |
| 2016/0289440 A1 * | 10/2016 | Janoski | C08L 29/14 |
| 2017/0362399 A1 | 12/2017 | Lipscomb | |

FOREIGN PATENT DOCUMENTS

| | | | |
|---|---|---|---|
| CN | 103342968 | 10/2013 | |
| CN | 103589320 | 2/2014 | |
| DE | 102005023405 | 1/2007 | |
| EP | 0411839 | 2/1991 | |
| EP | 0447115 | 9/1991 | |
| EP | 0570254 | 11/1993 | |
| EP | 0570515 | 11/1993 | |
| EP | 0617708 | 10/1994 | |
| EP | 0659844 | 6/1995 | |
| EP | 0710545 | 5/1996 | |
| EP | 0783550 | 7/1997 | |
| EP | 0783550 A1 * | 7/1997 | B32B 27/18 |
| EP | 0997750 | 5/2000 | |
| EP | 1038665 | 9/2000 | |
| EP | 2080786 | 7/2009 | |
| EP | 2163571 | 3/2010 | |
| EP | 2284221 | 2/2011 | |
| EP | 2623525 | 8/2013 | |
| EP | 2937733 | 10/2015 | |
| JP | S64-1737 | 1/1989 | |
| JP | S64-1737 * | 1/1989 | B32B 27/08 |
| JP | 09-324165 | 12/1997 | |
| JP | 10-168271 | 6/1998 | |
| JP | 10-292013 | 11/1998 | |
| JP | 2000-247014 | 9/2000 | |
| JP | 2000/247014 * | 9/2000 | B41M 5/00 |
| JP | 2003-040653 | 2/2003 | |
| JP | 2004-331413 | 11/2004 | |
| JP | 2005-015654 | 1/2005 | |
| JP | 2005-054065 | 3/2005 | |
| JP | 2005-166012 | 6/2005 | |
| JP | 2007-023145 | 2/2007 | |
| JP | 2007/277050 * | 10/2007 | C04B 35/622 |
| JP | 2007-277050 | 10/2007 | |
| JP | 2008-055690 | 3/2008 | |
| JP | 2008-106254 | 5/2008 | |
| JP | 2009-102467 | 5/2009 | |
| JP | 2010-083909 | 4/2010 | |
| JP | 5255390 | 4/2010 | |
| JP | 2011-012127 | 1/2011 | |
| JP | 2011-089027 | 5/2011 | |
| JP | 2014/005192 * | 1/2014 | C04B 35/632 |
| JP | 2014-005192 | 1/2014 | |
| JP | 5610604 | 10/2014 | |
| JP | 2014-224234 | 12/2014 | |
| KR | 0148852 | 10/1998 | |
| KR | 101289947 | 7/2013 | |
| WO | WO 1992-13924 | 8/1992 | |
| WO | WO 1995-013331 | 5/1995 | |
| WO | WO 1996-001687 | 1/1996 | |
| WO | WO 1998-015601 | 4/1998 | |
| WO | WO 1998-029516 | 7/1998 | |
| WO | WO 1999-003907 | 1/1999 | |
| WO | WO 2000-012574 | 3/2000 | |
| WO | WO 2003-012459 | 2/2003 | |
| WO | WO 2004-044019 | 5/2004 | |
| WO | WO 2005-023913 | 3/2005 | |
| WO | WO 2005-058594 | 6/2005 | |
| WO | WO-2005058594 A1 * | 6/2005 | B32B 27/08 |
| WO | WO 2006-094177 | 9/2006 | |
| WO | WO 2006-102383 | 9/2006 | |
| WO | WO 2009-029438 | 3/2009 | |
| WO | WO 2009-041017 | 4/2009 | |
| WO | WO 2009-146227 | 12/2009 | |
| WO | WO 2010-078071 | 7/2010 | |
| WO | WO 2010-078346 | 7/2010 | |
| WO | WO 2010-141345 | 12/2010 | |
| WO | WO 2011-042665 | 4/2011 | |
| WO | WO 2011-088096 | 7/2011 | |
| WO | WO 2011-094342 | 8/2011 | |
| WO | WO 2011-094350 | 8/2011 | |
| WO | WO 2012-069587 | 5/2012 | |
| WO | WO 2012-136941 | 10/2012 | |
| WO | WO 2012-148421 | 11/2012 | |
| WO | WO 2013-019699 | 2/2013 | |
| WO | WO 2013-019706 | 2/2013 | |
| WO | WO 2013-019766 | 2/2013 | |
| WO | WO 2013-019772 | 2/2013 | |
| WO | WO 2014-050746 | 4/2014 | |
| WO | WO 2014-123766 | 8/2014 | |
| WO | WO 2014-156214 | 10/2014 | |
| WO | WO 2014-172185 | 10/2014 | |
| WO | WO 2014-179432 | 11/2014 | |
| WO | WO 2015-064219 | 5/2015 | |
| WO | WO 2015-157350 | 10/2015 | |
| WO | WO 2015-187770 | 12/2015 | |
| WO | WO 2016-094112 | 6/2016 | |
| WO | WO 2016-094277 | 6/2016 | |
| WO | WO 2016-094280 | 6/2016 | |
| WO | WO 2017-112458 | 6/2017 | |
| WO | WO 2017-112468 | 6/2017 | |
| WO | WO 2017-112537 | 6/2017 | |
| WO | WO 2017-112564 | 6/2017 | |
| WO | WO 2017-214007 | 12/2017 | |

OTHER PUBLICATIONS

Saito—JP 2007-277050 A—ISR D#3—MT—green sheet—2007 (Year: 2007).*
D_Johnson_PhD_Thesis—2010 (Year: 2010).*
Mikayama—JP 2014-005192 A—ISR D#7—MT—graft methacrylate+PVB+Tg—2014 (Year: 2014).*
RoutledgeHandbooks—9781466577237—chapter3 (Year: 2015).*
Zanjani—Self-healing ofcracks in epoxy—RSC Adv.—2015 (Year: 2015).*
MatWeb—Overview of materials for Polyethylene Terephthalate (PET), Unreinforced—2019 (Year: 2019).*
Thermal Transitions of Homopolymers_Sigma-Aldrich (Year: 2019).*
Dow Fusabond® M603 Polymer Modifier (Year: 2019).*
Rueda-de-la-Garza-G-1988-PhD-Thesis—1987 (Year: 1987).*
Chen—Miscible PVB+PMMA blends—Macro—2001 (Year: 2001).*
Tripathy—PBT-PVB blends prepared in-situ polymerization of PBT—Polymer 2003 (Year: 2003).*
MatWeb—Overview of materials for Epoxy Adhesive (Year: 2020).*
"Nanodiamond dispersion for solvent based fluoropolymer coatings", Datasheet, 2016, Diamond Additive, 1 page.
Aran, "Tailoring the swelling and glass-transition temperature of acrylonitrile/hydroxyethyl acrylate copolymers", Journal of applied polymer science, 2010, vol. 116, pp. 628-635.
Butvar , "Polyvinyl butyral resin, properties and uses",pp. 01-32.
Carbodeon, "Carbodeon company presentation on nanodiamond additives to fluoropolymer coatings and composites", 20 pages.
Eastman, Product Data Sheet, "Tenite™ Propionate 307E4000018 Clear, Trsp", 2000 [retrieved from the internet on May 25, 2017], URL <http://ws.eastman.com/ProductCatalogApps/PageControllers/ProdDatasheet_PC.aspx?Pro>, pp. 1-2.
Kse, "Polyvinyl butyral of superior quality", Mowital, pp. 01-36.
Kuraray, "Technical data sheet", Mowital, 2 pages.
Pocius, Adhesion and Adhesive Technology ,3rd Ed., 2012, pp. 287-291.
Rohm and Haas, "Pressure sensitive adhesives", 2006, pp. 01-02.
Sideridou-Karayannidou, "Synthesis and characterization of copolymers of N-vinylcarbazole and N,N-dimethylaminoethyl acrylate", Polymer, 1999, vol. 40,No. 17 , pp. 4915-4922.

(56) References Cited

OTHER PUBLICATIONS

Wakabayashi, "Studies on s—Triazines. I. Contrimerization of Trichloroacetonitrile With Other Nitriles," Bulletin of the Chemical Society of Japan, 1969, vol. 42, pp. 2924-2930.
International Search Report for PCT International Application No. PCT/US2016/066309, dated Sep. 26, 2017, 8 pages.
Gower, et al., "Acrylic Acid Level and Adhesive Performance and Peel Master-Curves of Acrylic Pressure-Sensitive Adhesives," Journal of Polymer Science: Part B: Polymer Physics, vol. 44, pp. 1237-1252 (2006).
Chen, W., et al.; Macromolecules, 2001, vol. 34, p. 4277-4284.
3M™ Screen Printing Ink 1905 Black, Apr. 19, 2016, 1page.
3M™ Screen Printing UV Ink 9802 Opaque Black, Jan. 19, 2016, pp. 2-3.
FG00099—Vutek® GSLXR 3M Superflex Ink, Mar. 17, 2015, 3pgs.
HP Safety Data Sheet, C4940 Series, 9380 Version No. 02, May 14, 2015, 1pg.
KSE, "Introduction in properties and applications", Mowital, pp. 01-84.
Roland Data Sheet, ECO-SOL MAX2, ESL4-CY, ECO-SOL MAX2, ESL4-4CY, v. G_5.0, Dec. 21, 2015.
Standard Test Method for Tensile Properties of Thin Plastic Sheeting_ 10 Pages.
International Search Report for PCT International Application No. PCT/US2015/064215, dated Mar. 18, 2016, 5 pages.
International Search Report for PCT International Application No. PCT/US2015/064219, dated Mar. 18, 2016, 4 pages.
International Search Report for PCT International Application No. PCT/US2015/063073, dated Feb. 26, 2016, 4 pages.
International Search Report for PCT International Application No. PCT/US2016/066348, dated Mar. 31, 2017, 7pgs.
International Search Report for PCT International Application No. PCT/US2016/066453, dated Sep. 1, 2017, 5 pgs.

* cited by examiner

ACRYLIC POLYVINYL ACETAL FILMS COMPRISING A SECOND LAYER

CROSS REFERENCE TO RELATED APPLICATIONS

This application is a national stage filing under 35 U.S.C. 371 of PCT/US2016/066309, filed Dec. 13, 2016, which claims the benefit of U.S. Provisional Application No. 62/346,833, filed Jun. 7, 2016, and U.S. Provisional Application No. 62/270,750, filed on Dec. 22, 2015, the disclosure of which is incorporated by reference in its/their entirety herein.

SUMMARY

In one embodiment, a film is described comprising a first film layer having a Tg ranging from 30° C. to 60° C. The first film layer comprises a (meth)acrylic polymer and polyvinyl acetal polymer comprising polymerized units having the following formula

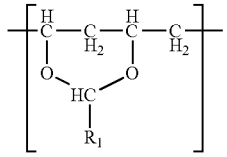

wherein $R_1$ is hydrogen or a C1-C7 alkyl group. The film further comprises a second layer proximate the first film layer. The second layer is different than the first film layer. The second layer does not comprise a (meth)acrylic polymer and a polyvinyl acetal polymer composition having a Tg less than 30° C.

DETAILED DESCRIPTION

Presently described are films comprising more than one layer. The film comprises at least one, i.e. a first film layer, comprising a (meth)acrylic polymer and polyvinyl acetal polymer.

The first film layer comprises polymerized units of one or more (meth)acrylate ester monomers derived from a (e.g. non-tertiary) alcohol containing 1 to 14 carbon atoms and preferably an average of 4 to 12 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like.

The first film layer comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the first film layer comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate. In some embodiments, the monomer is an ester of (meth)acrylic acid with an alcohol derived from a renewable source, such as 2-octyl (meth)acrylate.

The first film layer typically comprises at least 10, 15, 20 or 25 wt.-% of polymerized units of monofunctional alkyl (meth)acrylate low Tg monomer (e.g. having a Tg of less than 0° C.), based on the total weight of the polymerized units (i.e. excluding inorganic filler or other additives). As used herein, wt.-% of polymerized units refers to the wt.-% based on the total weight of the (meth)acrylic polymer, polyvinyl acetal (e.g. butyral) polymer, and crosslinker when present. The first film layer typically comprises no greater than 60, 55, 50, 45, or 40 wt.-% of polymerized units of monofunctional alkyl (meth)acrylate monomer having a Tg of less than 0° C., based on the total weight of the polymerized units.

In other embodiments, the first film layer comprises less than 10 wt.-% of polymerized units of monofunctional alkyl (meth)acrylate monomer having a Tg of less than 0° C. based on the total weight of the polymerized units of the (meth)acrylic polymer, polyvinyl acetal (e.g. butyral) polymer, and crosslinker when present. For example, the minimum concentration of polymerized units of monofunctional alkyl (meth)acrylate monomer having a Tg of less than 0° C. may be 0.5, 1, 2, 3, 4, 5, 6, 7, 8, or 9 wt.-%.

When the first film layer is free of unpolymerized components such as inorganic filler and additives, the wt.-% of specified polymerized units is approximately the same as the wt.-% of such polymerized units present in the total first film layer composition. However, when the first film layer composition comprises unpolymerized components, such as inorganic filler or other unpolymerizable additive the total first film layer composition can comprise substantially less polymerized units. In general, the total amount of unpolymerizable additives may range up to 25 wt.-%. Thus, in the case of first film layers comprising such unpolymerizable additives the concentration of specified polymerized units can be as much as 5, 10, 15, 20, 25 wt.-% less, depending on the total concentration of such additives. For example, when the first film layer comprises 20 wt.-% inorganic filler, the concentration of low Tg monofunctional alkyl (meth) acrylate monomer may be 20% less, i.e. at least 8 wt.-%, 12 wt.-% etc.

The first film layer generally comprises at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In typical embodiments, the first film layer comprises at least one high Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, and propyl methacrylate or combinations.

In some embodiments, the first film layer comprises at least 1, 2, or 3 wt.-% up to 35 or 40 wt.-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the first film layer comprises no greater than 30, 25, 20, or 10 wt.-% of polymerized units of high Tg monofunctional alkyl (meth)acrylate monomer. Further, in some embodiments, the first film layer comprises less than 1.0, 0.5, 0.1 wt.-% or is free of polymerized units of high Tg monofunctional alkyl (meth)acrylate monomer.

In other embodiments, the first film layer, comprises greater than 40 wt.-% of polymerized units of a monofunctional alkyl (meth)acrylate monomer having a Tg greater than 40° C. based on the total weight of the polymerized units of the (meth)acrylic polymer, polyvinyl acetal (e.g. butyral) polymer, and crosslinker when present. For example, the maximum concentration of polymerized units of a monofunctional alkyl (meth)acrylate monomer having a Tg greater than 40° C. may be 50, 60, 70, 80, or 90 wt.-%.

The Tg of the homopolymer of various monomers is known and is reported in various handbooks. The Tg of some illustrative monomers is also reported in WO 2016/094277; incorporated herein by reference.

In typical embodiments, the first film layer further comprises at least 10, 15 or 20 wt.-% and no greater than 65 wt.-% of polymerized units of polar monomers. Such polar monomers generally aids in compatibilizing the polyvinyl acetal (e.g. butyral) polymer with the high and low Tg alkyl (meth)acrylate solvent monomers. The polar monomers typically have a Tg greater than 0° C., yet the Tg may be less than the high Tg monofunctional alkyl (meth)acrylate monomer.

Representative polar monomers include for example acid-functional monomers, hydroxyl functional monomers, nitrogen-containing monomers, and combinations thereof.

In some embodiments, the first film layer comprises polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

In some embodiments, the first film layer comprises 0.5 up to 20 or 25 wt.-% of polymerized units of acid functional monomers, such as acrylic acid. In some embodiments, the first film layer composition comprises at least 1, 2, 3, 4, or 5 wt.-% of polymerized units of acid-functional monomers. In other embodiments, the first film layer composition comprises less than 1.0, 0.5, 0.1 wt.-% or is free of polymerized units of acid-functional monomers.

In some embodiments, the first film layer comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the first film layer comprises at least 0.5, 1, 2, 3, 4, or 5 wt.-% of polymerized units of nitrogen-containing monomers and typically no greater than 25 or 30 wt.-%. In other embodiments, first film layer comprises less than 1.0, 0.5, 0.1 wt.-% or is free of polymerized units of nitrogen-containing monomers.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth)acrylate, 2-(methoxyethoxy)ethyl, 2-methoxyethyl methacrylate, and polyethylene glycol mono(meth)acrylates.

In some embodiments, the first film layer comprises at least 0.5, 1, 2, 3, 4, or 5 wt.-% of polymerized units of alkoxy-functional (meth)acrylate monomers and typically no greater than 30 or 35 wt.-%. In other embodiments, the first film layer comprises less than 1.0, 0.5, 0.1 wt.-% or is free of polymerized units of alkoxy-functional (meth)acrylate monomers.

Preferred polar monomers include acrylic acid, 2-hydroxyethyl (meth)acrylate; N,N-dimethyl acrylamide and N-vinylpyrrolidinone. The first film layer generally comprises polymerized units of polar monomer in an amount of at least 10, 15 or 20 wt.-% and typically no greater than 65, 60, 55, 50 or 45 wt.-%.

The first film layer may optionally comprise vinyl monomers including vinyl esters (e.g., vinyl acetate and vinyl propionate), styrene, substituted styrene (e.g., α-methyl styrene), vinyl halide, and mixtures thereof. As used herein vinyl monomers are exclusive of polar monomers. In some embodiments, the first film layer comprises at least 0.5, 1, 2, 3, 4, or 5 wt.-% and typically no greater than 10 wt.-% of polymerized units of vinyl monomers. In other embodiments, the first film layer comprises less than 1.0, 0.5, 0.1 wt.-% or is free of polymerized units of vinyl monomers.

In some favored embodiments, the polymerized units of the (meth)acrylic polymer contain aliphatic groups and lack aromatic moieties.

In typical embodiments, the (e.g. solvent) monomer(s) are polymerized to form a random (meth)acrylic polymer copolymer.

The polyvinyl acetal polymer utilized in the present invention is obtained, for example, by reacting polyvinyl alcohol with aldehyde, as known in the art and described in greater detail in previously cited in WO2016/094277. The polyacetal resin is typically a random copolymer. However, block copolymers and tapered block copolymers may provide similar benefits as random copolymers.

The content of polyvinyl acetal (e.g. butyral) typically ranges from 65 wt.-% up to 90 wt.-% of the polyvinyl acetal (e.g. butyral) polymer. In some embodiments, the content of polyvinyl acetal (e.g. butyral) ranges from about 70 or 75 up to 80 or 85 wt.-%. The content of polyvinyl alcohol typically ranges from about 10 to 30 wt.-% of the polyvinyl acetal (e.g. butyral) polymer. In some embodiments, the content of polyvinyl alcohol of the polyvinyl acetal (e.g. butyral) polymer ranges from about 15 to 25 wt.-%. The content of polyvinyl acetate of the polyvinyl acetal (e.g. butyral) polymer can be zero or range from 1 to 8 wt.-% of the polyvinyl acetal (e.g. butyral) polymer. In some embodiments, the content of polyvinyl acetate ranges from about 1 to 5 wt.-%.

In some embodiments, the alkyl residue of aldehyde comprises 1 to 7 carbon atoms. In other embodiments, the alkyl reside of the aldhehyde comprises 3 to 7 carbon atoms such as in the case of butylaldehyde ($R_1$=3), hexylaldehyde ($R_1$=5), n-octylaldehyde ($R_1$=7). Of these butylaldehyde, also known as butanal is most commonly utilized. Polyvinyl butyral ("PVB") polymer is commercially available from Kuraray under the trade designation "Mowital™" and Solutia under the trade designation "Butvar™".

In some embodiments, the polyvinyl acetal (e.g. butyral) polymer has a Tg ranging from about 60° C. up to about 75° C. or 80° C. In some embodiments, the Tg of the polyvinyl acetal (e.g. butyral) polymer is at least 65 or 70° C. When other aldehydes, such as n-octyl aldehyde, are used in the preparation of the polyvinyl acetal polymer, the Tg may be less than 65° C. or 60° C. The Tg of the polyvinyl acetal polymer is typically at least 35, 40 or 45° C. When the polyvinyl acetal polymer has a Tg of less than 60° C., higher concentrations of high Tg monomers may be employed in the first film layer composition in comparison to those utilizing polyvinyl butyral polymer. When other aldehydes, such as acetaldehyde, are used in the preparation of the polyvinyl acetal polymer, the Tg may be greater than 75° C. or 80° C. When the polyvinyl acetal polymer has a Tg of greater than 70° C., higher concentrations of low Tg monomers may be employed in the first film layer composition in comparison to those utilizing polyvinyl butyral polymer.

In some embodiments, the polyvinyl acetal (e.g. PVB) polymer typically has an average molecular weight (Mw) of at least 10,000 g/mole or 15,000 g/mole and no greater than 150,000 g/mole or 100,000 g/mole. In some favored embodiments, the polyacetal (e.g. PVB) polymer has an average molecular weight (Mw) of at least 20,000 g/mole; 25,000; 30,000, 35,000 g/mole and typically no greater than 75,000 g/mole.

In some embodiments, the first film layer comprises 5 to 30 wt.-% of polyvinyl acetal polymer such as polyvinyl butyral based on the total weight of the polymerized units of the (meth)acrylate polymer, polyvinyl acetal (e.g. butyral) polymer, and crosslinker when present. In some embodiments, the first film layer comprises at least 10, 11, 12, 13, 14, or 15 wt.-% of polyvinyl acetal (e.g. PVB) polymer. In some embodiments, the first film layer comprises no greater than 25 or 20 wt.-% of polyyinyl acetal (e.g. PVB) polymer. When the first film layer comprises a polyvinyl acetal (e.g. PVB) polymer having an average molecular weight (Mw) less than 50,000 g/mole, the first film layer may comprise higher concentration polyvinyl acetal (e.g. PVB) polymer such as 35 or 40 wt.-%. Thus, the film and composition comprises a minor amount of polyvinyl acetal (e.g. PVB) resin in combination with a major amount of (meth)acrylic polymer. The amount of (meth)acrylic polymer is typically at least 50, 55, 60, 65, 70, 75, 80, 85, 90, or 95 wt.-% of the film.

In other embodiments, the first film layer comprises less than 5 wt.-% of polyvinyl acetal (e.g. butyral) polymer based on the total weight of the polymerized units of the (meth) acrylic polymer, polyvinyl acetal (e.g. butyral) polymer, and crosslinker when present. For example, the minimum concentration of polyvinyl acetal (e.g. butyral) polymer may be 0.5, 1, 1.5, 2, 1.5, 3, 3.5, 4, or 4.5 wt.-%

In some embodiments, the first film layer comprises polymerized crosslinker units. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. $C_3$-$C_{20}$ olefin groups); as well as chlorinated triazine crosslinking compounds.

Examples of useful (e.g. aliphatic) multifunctional (meth) acrylate include, but are not limited to, di(meth)acrylates, tri(meth)acrylates, and tetra(meth)acrylates, such as 1,6-hexanediol di(meth)acrylate, poly(ethylene glycol) di(meth) acrylates, polybutadiene di(meth)acrylate, polyurethane di(meth)acrylates, and propoxylated glycerin tri(meth)acrylate, and mixtures thereof.

In one embodiment, the crosslinking monomer comprises a (meth)acrylate group and an olefin group. The olefin group comprises at least one hydrocarbon unsaturation. The crosslinking monomer may have the formula

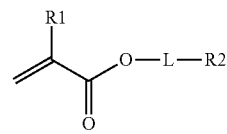

R1 is H or $CH_3$,
L is an optional linking group; and
R2 is an olefin group, the olefin group being optionally substituted.

Dihydrocyclopentadienyl acrylate is one example of this class of crosslinking monomer. Other crosslinking monomers of this type comprising a $C_6$-$C_{20}$ olefin are described in WO2014/172185.

In other embodiments, the crosslinking monomer comprises at least two terminal groups selected from allyl, methallyl, or combinations thereof. An allyl group has the structural formula $H_2C=CH-CH_2-$. It consists of a methylene bridge ($-CH_2-$) attached to a vinyl group ($-CH=CH_2$). Similarly, a methallyl group is a substituent with the structural formula $H_2C=C(CH_3)-CH_2-$. The terminology (meth)allyl includes both allyl and methallyl groups. Crosslinking monomers of this types are described in PCT Publication WO2015/157350.

In some embodiments, the first film layer may comprise a multifunctional crosslinker comprising vinyl groups, such as in the case of 1,3-divinyl tetramethyl disiloxane.

The triazine crosslinking compound may have the formula.

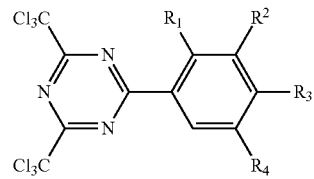

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt.-% ranging up to 5 or 10 wt.-% based on the total weight of the polymerized units of the (meth)acrylate polymer, polyvinyl acetal (e.g. butyral) polymer, and crosslinker. Thus, the first film layer comprises such amount of polymerized crosslinker units.

In other embodiments, the first film layer comprises greater than 10 wt.-% of polymerized crosslinker units based on the total weight of the polymerized units of the (meth)acrylic polymer, polyvinyl acetal (e.g. butyral) polymer, and crosslinker when present. For example, the maximum concentration of polymerized crosslinker units may range up to 50, 55, 60, 65, 70, 75 or 80 wt.-%.

The first film layer can be polymerized by various techniques, yet is preferably polymerized by solventless radiation polymerization, including processes using electron beam, gamma, and especially ultraviolet light radiation. In this (e.g. ultraviolet light radiation) embodiment, generally little or no methacrylate monomers are utilized. Thus, the first film layer comprises zero or no greater than 10, 9, 8, 7, 6, 5, 4, 3, 2, or 1 wt.-% of polymerized units of monomer having a methacrylate group. One method of preparing the first film layer described herein comprises dissolving the polyvinyl acetal (e.g. PVB) polymer polymer in the unpolymerized solvent monomer(s) of the (meth)acrylic polymer forming a coatable composition of sufficient viscosity.

Another method includes partially polymerizing the solvent monomer(s) to produce a syrup composition comprising a solute (meth)acrylic polymer dissolved in unpolymerized solvent monomer(s).

The polyvinyl acetal (e.g. PVB) polymer can be added prior to and/or after partial polymerization of monomer(s) of the (meth)acrylic polymer. In this embodiment, the coatable composition comprises partially polymerized (e.g. alkyl (meth)acrylate) solvent monomers and polyvinyl acetal (e.g. PVB) polymer polymer. The coatable composition is then coated on a suitable substrate and further polymerized.

The viscosity of the coatable composition is typically at least 1,000 or 2,000 cps ranging up to 100,000 cps at 25° C. In some embodiments, the viscosity is no greater than 75,000; 50,000, or 25,000 cps. The coatable composition is coated on a suitable substrate such as a release liner, and polymerized by exposure to radiation.

The method can form a higher molecular weight (meth)acrylic polymer than can be used by solvent blending a prepolymerized (meth)acrylic polymer and polyvinyl acetal (e.g. PVB) polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer.

The molecular weight of the first film layer composition can be increased even further by the inclusion of crosslinker.

The high molecular weight (meth)acrylic polymer as well as the first film layer typically has a gel content (as measured according to the Gel Content Test Method described in the examples utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%. When the (meth)acrylic polymer has a high gel content, it is typically not thermoplastic.

The polymerization is preferably conducted in the absence of unpolymerizable organic solvents such as ethyl acetate, toluene and tetrahydrofuran, which are non-reactive with the functional groups of the solvent monomer and polyvinyl (e.g. PVB) acetal. Solvents influence the rate of incorporation of different monomers in the polymer chain and generally lead to lower molecular weights as the polymers gel or precipitate from solution. Thus, the first film layer composition can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; photoactive oximes such as 1-phenyl-1, 2-propanedione-2-(O-ethoxy-carbonyl)oxime; mono- or bis-acrylphosphine oxides such as IRGANOX 819 or LUCIRIN TPO.

Preferred photoinitiators are photoactive compounds that undergo a Norrish I cleavage to generate free radicals that can initiate by addition to the acrylic double bonds. The photoinitiator can be added to the mixture to be coated after the polymer (e.g. syrup) has been formed, i.e., photoinitiator can be added. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt.-%. Relatively thick coatings can be achieved when the extinction coefficient of the photoinitiator is low.

The first film layer composition can be coated on an (e.g. unstructured) release liner using conventional coating techniques. For example, these film compositions can be applied by methods such as roller coating, flow coating, dip coating, spin coating, spray coating knife coating, and die coating. Coating thicknesses may vary. The film composition may be of any desirable concentration for subsequent coating, but is typically 5 to 30, 35 or 40 wt.-% polyvinyl acetal polymer solids in (meth)acrylic solvent monomer. The desired concentration may be achieved by further dilution of the coatable composition. The coating thickness may vary depending on the desired thickness of the (e.g. radiation) cured first film layer.

The coated release liner may be brought in contact with the second layer, prior to curing. Alternatively the first film layer may be cured prior to the second layer being disposed proximate the first layer.

The first film layer composition and the photoinitiator may be irradiated with activating UV radiation having a UVA maximum in the range of 280 to 425 nanometers to polymerize the monomer component(s). UV light sources can be of various types. Low light intensity sources, such as blacklights, generally provide intensities ranging from 0.1 or 0.5 mW/cm$^2$ (millwatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the monomer component(s) can be provided by various light sources such as light emitting diodes (LEDs), blacklights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some embodiments, the first film layer is transparent having a transmission of visible light of at least 90 percent. In some embodiments, the film, film layer, as well as the composition of (meth)acrylic polymer, polyvinyl acetal (e.g. butyral), and crosslinker when present is transparent having a transmission of visible light of at least 90, 91, 92, 93, 94, or 95% as measured according to the test method described in cofiled U.S. patent application Ser. No. 15/175,458. In some embodiments, the clarity is at least 90, 91, 92, 93, 94, or 95%. The transmission and clarity are typically less than 100%. In some embodiments, the haze is less than 15% or 10%. In some embodiments, the haze is less than 9, 8, 7, 6, 5, 4, 3, or 2%. The haze may be at least 0.5%.

In other embodiments, the first film layer is opaque (e.g. white) or reflective.

The film (e.g. first or second film layer) may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate) and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

When present, the amount of additive can be at least 0.1, 0.2, 0.3, 0.4, or 0.5 wt.-%. In some embodiments, the amount of additive is no greater than 25, 20, 15, 10 or 5 wt.-% of the total first film layer composition. In other embodiments, the concentration of additive can range up to 40, 45, 50, 55 or about 65 wt.-% of the total first film layer composition.

In some embodiments, the first film layer is free of plasticizer, tackifier and combinations thereof. In other embodiments, the first film layer composition comprise plasticizer, tackifier and combinations thereof in amount no greater than 5, 4, 3, 2, or 1 wt.-% of the total first film layer composition. From the standpoint of tensile strength, it is preferable not to add a large amount of tackifier or plasticizer.

In some embodiments, the first film layer composition comprises fumed silica. The concentration of (e.g. fumed) silica can vary. In some embodiments, the first film layer comprises at least 0.5 or 1.0 wt.-% of (e.g. fumed) silica.

The first film layer can be characterized using various techniques. Although the Tg of a copolymer may be estimated by use of the Fox equation, based on the Tgs of the constituent monomers and the weight percent thereof, the Fox equation does not take into effect interactions, such as incompatibility, that can cause the Tg to deviate from the calculated Tg. The Tg of the first film layer refers to the midpoint Tg as measured by Differential Scanning calorimetry, (DSC), according to the test method described in previously cited WO2016/094277. When the film and (e.g. radiation) cured composition comprises a monomer having a Tg greater than 150° C., the upper limit of the DSC testing temperature is chosen to be higher than that of the highest Tg monomer. The midpoint Tg as measured by DSC is 10-12° C. lower than the peak temperature Tg as measured by Dynamic Mechanical Analysis (DMA) at a frequency of 10 Hz and a rate of 3° C./min. Thus, a Tg of 60° C. as measured according to DSC is equivalent to 70-72° C. when measured according to DMA as just described.

The Tg of the first film layer and is generally at least 20, 25, or 30° C. ranging up to 55, 56, 57, 58, 59, or 60° C. In some embodiments, the Tg of the first film layer is at least 31, 32, 33, 34, or 35° C. In other embodiments, the Tg of the first film layer is at least 36, 37, 38, 39, or 40° C. In yet other embodiments, the Tg of the first film layer is at least 41, 42, 43, 44, or 45° C. In some embodiments, the first film layer exhibits a single Tg as measured by DSC. Thus, the polymerized (meth)acrylic polymer and polyvinyl acetal polymer composition alone or in combination with crosslinker can exhibit a single Tg.

A single Tg is one indication of a single (e.g. continuous) phase morphology. Thus, the film, as well as the polymerized (meth)acrylic polymer and polyvinyl acetal polymer composition alone or in combination with crosslinker can be characterized as a single (e.g. continuous) phase. Alternatively, the film or (e.g. radiation) cured composition can be tested by transmission electron microscopy (TEM) according to the test method described in cofiled U.S. Pat. No. 10,167,386. Single (e.g. continuous) phase morphology is preferred for films having low haze and high transmission.

In other embodiments, the film, as well as the polymerized (meth)acrylic polymer and polyvinyl acetal polymer composition alone or in combination with crosslinker can be characterized as having a dispersed phase of polyvinyl acetal (e.g. butyral) in a continuous phase of (meth)acrylic polymer. The average dispersion size can be calculated by averaging the diameter of randomly chosen particles (e.g. 100 particles) of the dispersed phase utilizing TEM. The average dispersion size can range from 0.1 to 10 microns. In some embodiments, the average dispersion size is less than 0.5, 0.3, 0.4, 0.3, 0.1 microns.

An average dispersion size of less than 0.1 microns can also provide films having a low haze and high transmission.

The first film layer can be characterized by tensile and elongation according to the test method described in previously cited WO 2016/094277. In some embodiments, the tensile strength is at least 10, 11, 12, 13, 14 or 15 MPa and typically no greater than 50, 45, 40, or 35 MPa. The elongation at break can ranges from 2, 3, 4 or 5% up to about 150%, 200% or or 300% and greater. In some embodiments, the elongation is at least 50, 100, 150, or 175% and may range up to 225, 250, 275, or 300%.

The first film layer is preferably non-tacky to the touch at room temperature (25° C.) and preferably at (e.g. storage or shipping) temperatures ranging up to (120° F.) 50° C. In some embodiments, the first film layer may exhibit a low level of adhesion to glass. For example, the 180° peel values can be about 2 oz/inch or less at a 12 inch/minute peel rate.

The film further comprises a second layer proximate the first film layer. The second layer may be in contact with the first film layer or a primer or adhesion-promoting treatment may be disposed between the (e.g. base) first film layer and the second layer (e.g. backing, hardcoat, cover film). In yet another embodiment, an adhesive may be disposed between the first film layer and second layer. In typical embodiments, the second layer is continuous and unstructured. The film can comprise more than one second layer.

Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. The base film layer and/or backing may also be subjected to an adhesion-promoting treatment such as air or nitrogen corona treatment, plasma, flame, or actinic radiation.

The second layer is different than the first film layer. When the second layer is transparent, it can be utilized as any layer within the film, such as a backing or cover film. When the second film layer is opaque (e.g. white) or reflective, it is typically utilized as a backing or intermediate layer.

In some embodiments, the second layer is a pre-formed (e.g. extruded) film. In other embodiments, the second layer is formed from drying and optionally curing a solvent-based coating or water-based coating composition.

In some embodiments, the second layer also comprises a (meth)acrylic polymer and a polyvinyl acetal polymer composition. In this embodiment, the Tg of the second layer is not less than 30° C. Rather the Tg is at least 30° C. or 35° C. or greater.

When the first film layer and second (e.g, film) layer both comprise (meth)acrylic polymer and polyvinyl acetal polymer composition, the compositions are not the same. For example, the compositions may have a different color, different opacity, or different concentration of polymerized units of a specified monomer.

In some embodiments, the second (e.g. film) layer comprises a cured (e.g. (meth)acrylic composition typically having a Tg of at least 30° C. In some embodiments, the second (e.g. film) layer has a higher glass transition temperature, Tg, than the first film layer. In some embodiments, the Tg of the second (e.g. film) layer is greater than 40, 45, 50, 55, or 60° C. In some embodiments, the second layer may be characterized as a hardcoat or topcoat.

In some embodiments, the second layer comprises a (e.g. free-radically) polymerizable composition that comprises a (meth)acrylic polymer without a polyvinyl acetal polymer.

The (meth)acrylic polymer composition of the second layer may comprise at least 50 wt.-%, 60 wt.-%, 70 wt.-%, 80 wt.-%, or 90 wt.-% of polymerized units of one or more multifunctional free-radically polymerizable monomer(s) and/or oligomer(s) that can be phototcured once the (e.g. hardcoat) composition has been coated. Useful multi-(meth)acrylate monomers and oligomers include:

(a) di(meth)acrylate such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acrylates such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acrylates such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acrylates such as, for example, urethane acrylates, polyester acrylates, and epoxy acrylates can also be employed.

In some embodiments, the polymerizable composition of the second layer includes both poly(meth)acrylate and polyurethane material, which can be termed a "urethane acrylate."

Various (meth)acrylate monomers and oligomers are available from vendors such as, for example, Sartomer Company of Exton, Pa.; UCB Chemicals Corporation of Smyrna, Ga.; and Aldrich Chemical Company of Milwaukee, Wis.

In some embodiments, the second (e.g. film) layer comprises at least one monomer, oligomer, or polymer comprising a silicone group or fluorinated group. In inclusion of such generally lowers the surface energy of the coating composition and thus may be characterized as a low surface energy group.

The amount of material comprising the silicone or fluorinated group is generally relatively low and thus such material can be characterized as low surface energy additives.

The second (e.g. film) layer typically comprises at least 0.05 and preferably at least 0.10 wt-% solids of one or more low surface energy additive(s). The total amount of low surface energy additive(s) can range up to 10 wt-% solids. In some embodiments, the amount of low surface energy additive(s) ranges up to 1 wt-%, 2 wt-%, 3 wt-%, 4 wt-%, or 5 wt-% solids.

Various fluorinated low surface energy groups are known including perfluoroalkyl groups and perfluoropolyether groups.

A fluorinated group, and especially a perfluoropolyether group, can be favored for concurrently providing ink repellency.

The cured surface layer and coated articles exhibit "ink repellency" when ink from a pen, commercially available under the trade designation "Sharpie", beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

A surface comprising the cured coating described herein preferably exhibits a high advancing contact angle with water of at least 70 degrees. More preferably, the advancing contact angle with water is at least 80 degrees and more preferably at least 90 degrees. Cured coating compositions comprising fluorinated additives and silicone additives (e.g. TEGO® Rad 2100) typically exhibit high advancing contact angles with water.

The surface comprising the cured coating described herein preferably exhibits a receding contact angle with hexadecane of at least 40, 45 or 50 degrees and typically no greater than 60 degrees.

The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of —$(C_pF_{2p})$—, —$(C_pF_{2p}O)$—, —$(CF(Z))$—, —$(CF(Z)O)$—, —$(CF(Z)C_pF_{2p}O)$—, —$(C_pF_{2p}CF(Z)O)$—, —$(CF_2CF(Z)O)$—, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be $(C_pF_{2p+1})$—, $(C_pF_{2p+1}O)$—, $(X'C_pF_{2p}O)$—, or $(X'C_pF_{2p+1})$— where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include $CF_3O(C_2F_4O)_nCF_2$—, $C_3F_7O$ $(CF_2CF_2CF_2O)_nCF_2CF_2$—, and $C_3F_7O(CF(CF_3)CF_2O)_nCF$ $(CF_3)$— wherein n has an average value of 0 to 50, 1 to 50, 3 to 30, 3 to 15, or 3 to 10.

Suitable structures for divalent $R_f$ groups include, but are not limited to, —$CF_2O(CF_2O)_q(C_2F_4O)_nCF_2$—, —$(CF_2)_3O$ $(C_4F_8O)_n(CF_2)_3$—, —$CF_2O(C_2F_4O)_nCF_2$—, —$CF_2CF_2O$ $(CF_2CF_2CF_2O)_nCF_2CF_2$—, and —$CF(CF_3)(OCF_2CF$ $(CF_3))_sOC_tF_{2t}O(CF(CF_3)CF_2O)_nCF(CF_3)$—, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

For embodiments wherein Rf is divalent and two (e.g. terminal) reactive groups are bonded to Rf (such as in the case of a diol), the concentration of such divalent monomer is sufficiently low as to avoid excessive crosslinking that can result in formation of a gel.

In some embodiments, the second (e.g. film) layer comprises a perfluoropolyether urethane additive.

The perfluoropolyether urethane material is preferably prepared from an isocyanate reactive HFPO— material. Unless otherwise noted, "HFPO—" refers to the end group $F(CF(CF_3)CF_2O)_aCF(CF_3)$— of the methyl ester $F(CF(CF_3)CF_2O)_aCF(CF_3)C(O)OCH_3$, wherein "a" averages 2 to 15. In some embodiments, "a" averages between 3 and 10 or a averages between 5 and 8. Such species generally exist as a distribution or mixture of oligomers with a range of values for "a", so that the average value of a may be non-integer. For example, in one embodiment, "a" averages 6.2. The molecular weight of the HFPO— perfluoropolyether material varies depending on the number ("a") of repeat units from about 940 g/mole to about 1600 g/mole, with 1100 g/mole to 1400 g/mole typically being preferred.

In one embodiment, the reaction product comprises a perfluoropolyether urethane additive of the formula:

wherein
$R_i$ is the residue of a multi-isocyanate;
X is O, S or NR, wherein R is H or an alkyl group having 1 to 4 carbon;
$R_f$ is a monovalent perfluoropolyether moiety comprising groups of the formula $F(R_{fc}O)_xC_dF_{2d}$—,
wherein each $R_{fc}$ is independently a fluorinated alkylene group having from 1 to 6 carbon atoms,
each x is an integer greater than or equal to 2, and wherein d is an integer from 1 to 6;
each Q is independently a connecting group having a valency of at least 2;
A is a (meth)acryl functional group —$XC(O)C(R_2)=CH_2$ wherein $R_2$ is an alkyl group of 1 to 4 carbon atoms or H or F;
m is at least 1; n is at least 1; p is 2 to 6; m+n is 2 to 10; wherein each group having subscripts m and n is attached to the $R_i$ unit.

Q in association with the Rf group is a straight chain, branched chain, or cycle-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

When X is O, Q is typically not methylene and thus contains two or more carbon atoms. In some embodiments, X is S or NR. In some embodiments, Q is an alkylene having at least two carbon atoms. In other embodiments, Q is a straight chain, branched chain, or cycle-containing connecting group selected from arylene, aralkylene, and alkarylene. In yet other embodiments, Q contains a heteroatom such as O, N, and S and/or a heteroatom containing functional groups such as carbonyl and sulfonyl. In other embodiments, Q is a branched or cycle-containing alkylene group that optionally contains heteroatoms selected from O, N, S and/or a heteroatom-containing functional group such as carbonyl and sulfonyl. In some embodiments Q contains a nitrogen containing group such an amide group such as —$C(O)NHCH_2CH_2$—, —$C(O)NH(CH_2)_6$—, and —$C(O)$ $NH(CH_2CH_2O)_2CH_2CH_2$—.

Various perfluoropolyether urethane additives can be utilized as described in PCT Publication WO2006/102383; incorporated herein by reference.

Alternatively or in combination with a low surface energy additive comprising a fluorinated group, the hardcoat may comprise a low surface energy additive comprising a silicone group.

In one embodiment, the low surface energy additive comprises a polydimethylsiloxane (PDMS) backbone and at least one (meth)acrylate group.

In one embodiment, the low surface energy additive comprises at least one alkoxy side chain terminating with a (meth)acrylate group. The alkoxy side chain may optionally comprise at least one hydroxyl substituent. Such silicone (meth)acrylate additives are commercially available from various suppliers such as Tego Chemie under the trade designations TEGO Rad 2300 "TEGO Rad 2250", "TEGO Rad 2300", "TEGO Rad 2500", and "TEGO Rad 2700". Of these, "TEGO Rad 2100" provided the lowest lint attraction.

Based on NMR analysis "TEGO Rad 2100" and "TEGO Rad 2500" are believed to have the following chemical structure:

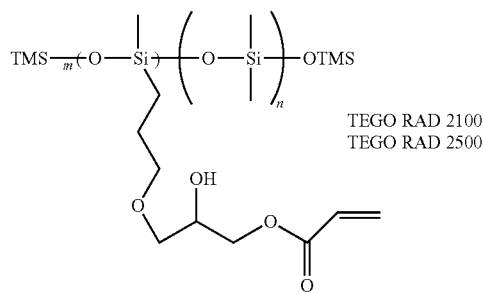

TEGO RAD 2100
TEGO RAD 2500 wherein n ranges from 10 to 20 and m ranges from 0.5 to 5.

In some embodiments, n ranges from 14 to 16 and m ranges from 0.9 to 3. The molecular weight typically ranges from about 1000 g/mole to 2500 g/mole.

Based on Thermal Gravimetric Analysis (according to the test method described in the example), silicone (meth) acrylates having a residue content of less than 12 wt-% provided the lowest haze values according to the Cellulose Surface Attraction Test.

Compositions comprising a low surface energy additive comprising a silicone group have been found to provide low lint attraction. In some embodiments, the surface layers (e.g. comprising such silicone (meth)acrylate additives) preferably have a haze of less than 20%, more preferably less than 10% and even more preferably less than 5% according to the Cellulose Surface Attraction Test described in WO 2009/029438; incorporated herein by reference.

In some embodiments, the second layer (e.g. backing, topcoat, or cover film) comprises or consists of a fluoropolymer. Fluoropolymers are general derived from one or more fluorinated monomer(s) such as tetrafluoroethylene (TFE), vinyl fluoride (VF), vinylidene fluoride (VDF), hexafluoropropylene (HFP), pentafluoropropylene, trifluoroethylene, trifluorochloroethylene (CTFE), perfluorovinyl ethers (including perfluoroallyl vinyl ethers and perfluoroalkoxy vinyl ethers), perfluoroallyl ethers (including perfluoroalkyl allyl ethers and perfluoroalkoxy allyl ethers), perfluoroalkyl vinyl monomers, and combinations thereof.

In some embodiments, the fluoropolymer is formed from the constituent monomers known as tetrafluoroethylene ("TFE"), hexafluoropropylene ("HFP"), and vinylidene fluoride ("VDF," "VF2,"). The monomer structures for these constituents are shown below:

TFE: $CF_2=CF_2$      (1)

VDF: $CH_2=CF_2$      (2)

HFP: $CF_2=CF-CF_3$      (3)

The fluoropolymers preferably comprise at least two of the constituent monomers (HFP and VDF), and more preferably all three of the constituents monomers in varying molar amounts. Additional monomers not depicted in (1), (2) or (3) but also useful include perfluorovinyl ether monomers of the general structure $CF_2=CF-OR_f$, wherein $R_f$ can be a branched or linear perfluoroalkyl radicals of 1-8 carbons and can itself contain additional heteroatoms such as oxygen. Specific examples are perfluoromethyl vinyl ether, perfluoropropyl vinyl ethers, perfluoro(3-methoxypropyl) vinyl ether. Additional examples are found in Worm (WO 00/12574), assigned to 3M, and in Carlson (U.S. Pat. No. 5,214,100).

Various fluoroplastics and fluoroelastomers are known such as described in U.S. Pat. No. 3,929,934. In some embodiments, the elastomers have the general formula:

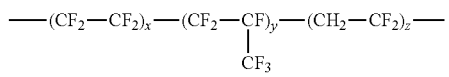

wherein x, y and z are expressed as molar percentages. In some embodiments, x, y, and z are chosen to comprise no greater than 40 or 35 wt.-% TFE, no greater than 25 wt. % HFP and no greater than 70, 65, or 60 wt.-% VDF. In other embodiments, the copolymer comprising no more than 80, 70 or 60 wt.-% VDF and no more than 60, 50, or 40 wt.-% HFP.

For improved durability, the fluoropolymer may be polymerized in the presence of a chain transfer agent and/or halogen-containing cure site monomers and/or halogenated endgroups to introduce cure sites into the fluoropolymer. These halogen groups can provide reactivity with the adhesion promoting group and facilitate the formation of the polymer network. Useful halogen-containing monomers are well known in the art and typical examples are found in WO2014/179432.

Optionally halogen cure sites can be introduced into the polymer structure via the use of halogenated chain transfer agents which produce fluoropolymer chain ends that contain reactive halogen endgroups. Such chain transfer agents ("CTA") are well known in the literature and typical examples are: $Br-CF_2CF_2-Br$, $CF_2Br_2$, $CF_2I_2$, $CH_2I_2$. Other typical examples are found in U.S. Pat. No. 4,000,356 to Weisgerber.

In another embodiment, the fluoropolymer can be rendered reactive by dehydrofluorinated by any method that will provide sufficient carbon-carbon unsaturation of the fluoropolymer to create increased bond strength between the fluoropolymer and a hydrocarbon substrate or layer. The dehydrofluorination process is a well-known process to induced unsaturation and it is used most commonly for the ionic crosslinking of fluoroelastomers by nucleophiles such as diphenols and diamines. This reaction is characteristic of VDF containing elastomers. Furthermore, such a reaction is also possible with primary and secondary aliphatic monofunctional amines and will produce a DHF-fluoropolymer with a pendent amine side group.

In some embodiments, the second (e.g. film or hardcoat) layer further comprises inorganic oxide nanoparticles. The inorganic oxide nanoparticles can comprise silica, or can comprise a combination of oxides, such as silica and aluminum oxide, or a core of an oxide of one type (or a core of a material other than a metal oxide) on which is deposited an oxide of another type. Various high refractive index inorganic oxide nanoparticles can be employed such as for example zirconia ("$ZrO_2$"), titania ("$TiO_2$"), antimony oxides, alumina, tin oxides, alone or in combination. Mixed metal oxide may also be employed.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable (e.g. monomer and/or oligomer) organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependent upon several factors such as particle size, particle type, modifier molecular weight, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl) methoxyethoxyethyl carbamate, N-(3-triethoxysilylpropyl) methoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylme thyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

When the second layer is a coating composition, it can be applied to the surface of the film layer dried to remove the solvent and then cured for example by exposure to (e.g. ultraviolet) radiation. Alternatively, a transferable film may be formed coating the composition to a release liner, at least partially cured, and subsequently transferring from the release layer to the substrate using a thermal transfer or photoradiation application technique.

The second layer (e.g. hardcoat) coating composition can be applied as a single or multiple layers directly to an article or film substrate using conventional film application techniques. Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

In some embodiments, the second layer can be characterized as a backing. In yet another embodiment, the film may comprises a first film layer, as previously described, a second layer proximate the first film layer wherein the second (e.g. film) layer comprises a cured (meth)acrylic polymer, and the film further comprises a backing. The first film layer is typically disposed between the backing and second (e.g. film) layer.

The backing can comprise a variety of flexible and inflexible (e.g. preformed web) substrates including but not limited to polymeric films, woven or nonwoven fabrics, metal foils, foams, paper, and combinations thereof (e.g. metalized polymeric film). Polymeric films include for example polyolefins such as polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, ethyl cellulose, as well as bio-based material such as polylactic acid (PLA). The woven or nonwoven fabric may comprise fibers or filaments of synthetic or natural materials such as cellulose (e.g. tissue), cotton, nylon, polyethylene, rayon, glass, ceramic materials, and the like.

In some embodiments, the second layer (e.g. backing, topcoat, or cover film) is a (e.g. thermoplastic) polymer such as polycarbonate, polyethylene terephthalate, polyamide, polyethylene, polypropylene, polystyrene, polyvinyl chloride, poly(meth)acrylic polymer, ABS (acrylonitrile-butadiene-styrene copolymer), and the like.

In some embodiments, the second layer (e.g. backing, hardcoat, or cover film) is a transparent film having a transmission of visible light of at least 90 percent.

In other embodiments, the second layer (e.g. backing) is opaque (e.g. white) or reflective.

In another embodiment, the first film layer or second film layer (e.g. backing) may further comprise a metal or metal oxide layer. Examples of metals include aluminum, silicon, magnesium, palladium, zinc, tin, nickel, silver, copper, gold, indium, stainless steel, chromium, titanium, and so on. Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more. Layers of these metals and/or metal oxides can be formed by known methods such as vacuum deposition, ion plating, sputtering, and CVD (Chemical Vapor Deposition). The thickness of the metal and/or metal oxide layer is typically at least 5 nm ranging up to 100 or 250 nm.

The thickness of the backing is typically at least 10, 15, 20, or 25 microns (1 mil) and typically no greater than 500 microns (20 mil) thickness. In some embodiments, the thickness of the backing is no greater than 400, 300, 200, or 100 microns. The first film layer and second (e.g. film) layer may have the same thickness as the backing. However, the first and/or second (e.g., film) layer, particularly when utilized in combination with a backing, may be less than 10 microns. In some embodiments, the first and/or second film layer is typically at least 250 nm, 500 nm, 750 nm or 1 micron. The backing as well as the overall film is typically in the form of a roll-good, but may also be in the form of individual sheets.

In some embodiments, the overall film, first film layer and/or backing is conformable. By "conformable" it is meant that the film or film layer is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

Suitable conformable base film layer and/or backings include, for example, polyvinyl chloride (PVC), plasticized polyvinyl chloride, polyurethane, polyethylene, polypropylene, fluoropolymer or the like. Other polymer blends are also potentially suitable, including for example thermoplastic polyurethane and a cellulose ester.

In some embodiments, the conformable film, first film layer, and/or backing has sufficient inelastic deformation after being stretched so that when stretched, the film does not recover to its original length. In some embodiments, the film, first film layer, and/or backing has an inelastic deformation of at least 5% after being stretched once to 115% of their original length. In other embodiments, the conformability of the film, first film layer, or backing as determined by % tensile set as described in WO2016/094277, is at least 20, 25, or 30%.

In some embodiments, a layer of an adhesive composition is proximate the first film layer or second backing. The adhesive is typically disposed directly on the first film or second backing or may comprise a primer or adhesion promoting treatment between the first film or backing and the adhesive layer. The type of primer will vary with the type of film and adhesive used and one skilled in the art can select an appropriate primer. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. Typically, primers are dispersed into a solvent at very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof.

In one embodiment, a sufficiently transparent layer of an adhesive composition may be disposed between the first film layer and a second (e.g. film) layer. The first film layer may be a backing, a cover film, or both the backing and the cover film.

The adhesive layer may be any suitable adhesive. Non-limiting examples of adhesives include pressure sensitive adhesives, heat activated adhesives, radiation curable adhesives, and the like. Examples of formulation types include solvent-based solutions, water-based latex, microspheres, hot melt coatable, and suitable combinations thereof. The pressures sensitive adhesive (PSA) may be any type of PSA such as those described in the *Handbook of Pressure-Sensitive Adhesives*, Ed. D. Satas, 2 nd Edition, Von Nostrand Reinhold, N.Y., 1989. Classes of useful pressure sensitive adhesives include, for example, rubber resin materials such as tackified natural rubbers or those based on synthetic rubbers, styrene block copolymers, polyvinyl ethers, acrylics (including both acrylates and methacrylates), polyurethanes, poly-alpha-olefins, silicone resins, and the like. Combinations of these adhesives can be used. Additionally, further useful adhesives include those that may be activated at elevated temperature for application at use temperature. These generally meet the Dahlquist criterion at use temperature.

The pressure sensitive adhesive may be inherently tacky. If desirable, tackifiers may be added to a pressure sensitive adhesive base material to form the pressure sensitive adhesive. Useful tackifiers include, for example, rosin ester resins, aromatic hydrocarbon resins, aliphatic hydrocarbon resins, mixed aromatic/aliphatic hydrocarbon resins, and terpene resins. Other materials can be added for special purposes, including, for example, oils, plasticizers, antioxidants, ultraviolet ("UV") stabilizers, hydrogenated butyl rubber, pigments, fillers, curing agents, and crosslinkers. Some examples of fillers or pigments include zinc oxide, titanium dioxide, silica, carbon black, metal powders and calcium carbonate.

The adhesive layer may be applied using any conventional technique known to those skilled in the art. For example, the adhesive layer can be applied onto the film surface by coating, using for example a rotary rod die, slit die or gravure roll, or extrusion coating with conventional coating weights (e.g. 0.0004 to 0.008 g/cm2). The application of the adhesive layer may also be achieved by laminating the film with an adhesive layer, optionally covered by a release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

Examples of adhesives include PSA's, hot melt or heat activated adhesives that are the pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,516 (both Wilson et al) and U.S. Pat. No. 5,141,790 (Calhoun et al) and WO 96/1687 (Keller et al.) Other examples of PSA's are described in U.S. Pat. No. Re 24,906 (Ulrich), U.S. Pat. No. 4,833,179 (Young et al), U.S. Pat. No. 5,209,971 (Babu et al), U.S. Pat. No. 2,736, 721 (Dester), and U.S. Pat. No. 5,461,134 (Leir et al). Acrylate-based PSA's include those described in U.S. Pat. No. 4,181,752 (Clemens et al) and U.S. Pat. No. 4,418,120 (Kealy et al), WO 95/13331.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organosilicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer.

Alternatively the exposed surface of the film may be coated with a suitable release material, also referred to in the art as a low adhesive backsize (LAB). Release materials are known and include materials such as, for example, silicone, polyethylene, polycarbamate, polyacrylics, and the like. In some embodiments, the adhesive is an acrylic heat activated adhesive or acrylic pressure sensitive adhesive. Such adhesives can comprise the same general components as the (meth) acrylic polymer of the film. However, the adhesives generally comprise different concentrations of such components. For example, the adhesives often comprise a higher concentration of polymerized units of low Tg alkyl monofunctional (meth)acrylate monomer and/or a sufficient concentration of tackifer to lower the Tg and the tensile elastic modulus. In one embodiment, the acrylic adhesive comprises at least 65, 70, 75, 80, 85 or 90 wt.-% of polymerized units of low Tg alkyl monofunctional (meth)acrylate monomer, as previously described. In some embodiments, the acrylic adhesive comprises at least 0.1, 0.5, 1, 2, 3, 4, 5, 6, 7, 8, 9, or 10 wt.-% of a polar monomer, such as an acid functional monomer. The maximum concentration of polar monomer is the same as previously described for the film. In some embodiments, the acrylic adhesive comprises at least 0.4, 1, 1.5 or 2 wt-% up to about 10 or 15 wt-% of polymerized crosslinker units. The crosslinker may comprise a (meth)acrylate group and an olefin group as previously described. Alternatively, the acrylic adhesive may comprise a small concentration, e.g. less than 1 wt.-% of a triazine crosslinker. In some embodiments, the acrylic adhesive comprises greater than 5, 10, or 15 wt-% of tackifier and typically no greater than 20, 30, 40, or 50 wt.-%. In typical embodiments, the adhesive does not comprise a polyvinyl acetal (e.g. butyral) resin.

In some embodiments, the film is a graphic film used to apply designs, e.g. images, graphics, text and/or information, on windows, buildings, pavements or vehicles such as autos, vans, buses, trucks, streetcars and the like for e.g. advertising or decorative purposes. Many of the surfaces, e.g. vehicles, are irregular and/or uneven. In other embodiments, the film is a decorative tape.

Objects and advantages of this invention are further illustrated by the following examples. The particular materials and amounts, as well as other conditions and details, recited in these examples should not be used to unduly limit this invention.

| Materials | |
|---|---|
| Designation | Description |
| EHA | 2-Ethylhexyl acrylate, available from BASF, Florham Park, NJ. |
| IBOA | Isobornyl acrylate, available from San Esters, New York, NY. |
| HDDA | Hexanediol Diacrylate, available from Sartomer Americas, Exton, PA. |
| AA | Acrylic acid, available from BASF, Florham Park, NJ. |
| HEA | 2-Hydroxyl ethyl acrylate, available from BASF, Florham Park, NJ. |
| CN965 | An aliphatic polyester based urethane diacrylate oligomer available under the trade designation CN965 from Sartomer Americas, Exton, PA. |

-continued

Materials

| Designation | Description |
|---|---|
| SR444 | Pentaerythritol triacrylate available under the trade designation SR 444 from Sartomer Americas, Exton, PA. |
| Tego 1 | A radically-crosslinkable silicone acrylate available under the trade designation TEGORAD 2100, from Evonik Industries, Essen, Germany. |
| Tego 2 | A radically-crosslinkable silicone acrylate available under the trade designation TEGORAD 2650 from Evonik Industries, Essen, Germany. |
| Tego 3 | A radically-crosslinkable polydimethylsiloxane acrylate available under the trade designation TEGOMER V-SI 2250 from Evonik Industries, Essen, Germany. |
| Tego 4 | A radically-crosslinkable polysiloxane acrylate available under the trade designation TEGOMER V-SI 2854 from Evonik Industries, Essen, Germany. |
| HFPO-UA | A hexafluoropropylene oxide urethane acrylate prepared as described in U.S. Pat. No. 7,718,264, Preparation No. 6 at Column 25, lines 35-56. |
| BYK 1 | A crosslinkable surface additive for radiation curable systems for improving substrate wetting, scratch resistance, and easy-to-clean properties available under the trade designation BYK UV 3505 from BYK Industries, Wallingford, CT. |
| Irg 651 | 2,2-Dimethoxy-1,2-diphenylethan-1-one, available under the trade designation IRGACURE 651 from BASF Corporation, Vandalia, IL. |
| Irg 819 | Bis(2,4,6-trimethylbenzoyl)-phenylphosphineoxide, available under the trade designation IRGACURE 819 from BASF Corporation, Vandalia, IL. |
| Irg TPO-L | 2,4,6-trimethylbenzoylphenylphosphinic acid, available under the trade designation TPO-L from BASF Corporation, Vandalia, IL. |
| Tin 123 | A liquid hindered amine light stabilizer (HALS) based on an amino-ether functionality, available under the trade designation TINUVIN 123 from BASF Corporation, Vandalia, IL. |
| Tin 479 | A hydroxyphenyl-triazine (HPT) UV absorber, available under the trade designation TINUVIN 479 from BASF Corporation, Vandalia, IL. |
| Tin 928 | A UV absorber of the hydroxyphenyl benzotriazole class, available under the trade designation TINUVIN 928 from BASF Corporation, Vandalia, IL. |
| THV 221GZ | A fluorothermoplastic containing tetrafluoroethylene, hexafluoropropylene and vinylidene fluoride, having a glass transition temperature of 5° C., a melting point of 115° C., a modulus of 80 MegaPascals, a tensile strength of 20 MegaPascals, and a tensile elongation of 700%, available as THV 221GZ from 3M Dyneon, St. Paul, MN. |
| TMS | Tetramethyl silane, available from TCI America, Portland, OR. |
| B60H | Poly(vinyl butyral) having a glass transition temperature (Tg) of 70° C., available under the trade designation MOWITAL B60H from Kuraray, Houston, TX. |
| PET 1 | An untreated clear, amorphous, copolyester film having a nominal thickness of 51 micrometers (0.002 inches). |
| PET 3 | A silicone release liner having a nominal thickness of 51 micrometers (0.002 inches), obtained from Dupont Teijin, Dupont Chemical Company, Wilmington DE. |

Test Method 1—Ink Removal

A black permanent marker (SHARPIE brand) was used to draw a crosshatch pattern (#) measuring approximately 2-3 centimeters in size directly onto the exposed surface of the cured, overcoat layer. Next, immediately after drawing the pattern the film was rapidly wiped back and forth with a clean KIMWIPE tissue (Kimberly-Clark Corporation, Neenah, Wis.) approximately 10-20 times. Samples that were completely wiped clean were marked as "Pass" and those that were not completely clean after wiping were marked "Fail".

Test Method 2—Paint Removal

A few drops of RUST-OLEUM Quick Color General Purpose Aerosol Paint (Flat Black) (Rust-Oleum Corporation, Vernon Hills, Ill.) were applied onto the exposed surface of the cured, overcoat layer and the paint allowed to dry at room temperature for approximately 15 minutes. The dried paint area was wiped back and forth approximately 10-20 times total with a clean KIMWIPE tissue soaked with a few drops of isopropyl alcohol. A second piece of alcohol wetted KIMWIPE tissue was used as needed. Samples that were completely wiped clean were marked as "Pass" and those that were not completely clean after wiping were marked "Fail".

Preparation of Base Syrups 1

Base Syrup 1 was prepared by mixing the components and amounts shown in Table 1 below as follows. Acrylic monomers, crosslinker, and photoinitiator were combined in a 1 gallon (3.79 liters) glass jar and mixed using a high shear electric motor to provide a homogenous mixture. Next, B60H was then added over a period of about three minutes with mixing. This was followed by further high speed mixing until a homogeneous, viscous solution was obtained. This was then degassed for ten minutes at a vacuum of 9.9 inches (252 millimeters) mercury.

TABLE 1A

Base Syrup Formulations (parts by weight)

| Base Syrup | EHA | IBOA | AA | HEA | CN965:IBOA/ 1:1 (w:w) | Irg 651 | B60H |
|---|---|---|---|---|---|---|---|
| Base Syrup 1 | 29.57 | 13.50 | 12.32 | 12.32 | 17.21 | 0.25 | 14.83 |

Curing of the Compositions

All the UVA cured films and adhesive compositions were cured by exposure a UVA light source having a UVA maximum in the range of 350-400 nanometers. The total UVA energy was determined using a POWERMAP radiometer equipped with low power sensing head (available from EIT Incorporated, Sterling, Va.). The radiometer web speed and energy were then used to calculate the total UVA energy. The radiometer web speed was used to calculate the total exposure time.

Acrylic/PVB Film Articles with Easy-Clean Second Layer

Base syrups 2 and 3 were prepared in the same manner as Base Syrup 1 using the amounts shown in Table 1.

TABLE 1B

Base Syrup Formulations (parts by weight)

| Base Syrup | EHA | IBOA | CN 965 |
|---|---|---|---|
| Base Syrup 2 | 50.0 | 35.0 | 15.0 |
| Base Syrup 3 | 35.0 | 40.0 | 25.0 |

The cleanable overcoat formulations were prepared by combining either Base Syrup 2 or Base Syrup 3 with additional materials in the quantities shown in Table 2 and mixed as described for the preparation of Base Syrup 1. In addition, Example 11 also contained 10 parts by weight of Tin 928 and 5 parts by weight of Tin 479.

TABLE 2

Formulations for Overcoats

| Example | Base Syrup 2 | Base Syrup 3 | HDDA | SR444 | Tego 1 | Tego 2 | Tego 3 | Tego 4 | BYK1 | HFPO-UA | Irg 651 | TPO-L |
|---|---|---|---|---|---|---|---|---|---|---|---|---|
| 4 | | 54.8 | 40 | | | 0 | 5.0 | 0 | 0 | | 0.25 | |
| 5 | | 54.8 | 40 | | | 0 | 0 | 5.0 | 0 | | 0.25 | |
| 6 | | 54.8 | 40 | | | 5.0 | 0 | 0 | 0 | | 0.25 | |
| 7 | | 54.8 | 40 | | | 0 | 0 | 0 | 5.0 | | 0.25 | |
| 8 | 58.5 | | | 40 | 0 | | | | | 0 | | 1.5 |
| 9 | 56.5 | | | 40 | 2.0 | | | | | 0 | | 1.5 |
| 10 | 57.5 | | | 40 | 0 | | | | | 1.0 | | 1.5 |
| 11 | 55.5 | | | 40 | 2.0 | | | | | 1.0 | | 1.5 |
| 12 | 77.0 | | | 20 | 1.0 | | | | | 0.5 | | 1.5 |
| 13 | 77.5 | | | 20 | 1.0 | | | | | 0 | | 1.5 |
| 14 | 76.5 | | | 20 | 1.0 | | | | | 1.0 | | 1.5 |
| C1 | 98.5 | | | 0 | 0 | | | | | 0 | | 1.5 |
| C2 | 96.5 | | | 0 | 2.0 | | | | | 0 | | 1.5 |
| C3 | 97.5 | | | 0 | 0 | | | | | 1.0 | | 1.5 |
| C4 | 95.5 | | | 0 | 2.0 | | | | | 1.0 | | 1.5 |
| C5 | 87.0 | | | 10 | 1.0 | | | | | 0.5 | | 1.5 |

The wt.-% of the polymerized monomer units in the cured second layer is set forth in the following Table 3.

TABLE 3

| Ex. | HDDA | SR444 | Tego 1 | Tego 2 | Tego 3 | Tego 4 | BYK1 | HFPO-UA | Irg 651 | TPO-L | EHA | IBOA | CN965 |
|---|---|---|---|---|---|---|---|---|---|---|---|---|---|
| 4 | 40 | | | 0 | 5.0 | 0 | 0 | | 0.25 | | 19.2 | 21.9 | 13.7 |
| 5 | 40 | | | 0 | 0 | 5.0 | 0 | | 0.25 | | 19.2 | 21.9 | 13.7 |
| 6 | 40 | | | 5.0 | 0 | 0 | 0 | | 0.25 | | 19.2 | 21.9 | 13.7 |
| 7 | 40 | | | 0 | 0 | 0 | 5.0 | | 0.25 | | 19.2 | 21.9 | 13.7 |
| 8 | | 40 | 0 | | | | | 0 | | 1.5 | 29.3 | 20.5 | 8.8 |
| 9 | | 40 | 2.0 | | | | | 0 | | 1.5 | 28.3 | 19.8 | 8.5 |
| 10 | | 40 | 0 | | | | | 1.0 | | 1.5 | 28.8 | 20.1 | 8.6 |
| 11 | | 40 | 2.0 | | | | | 1.0 | | 1.5 | 27.8 | 19.4 | 8.3 |
| 12 | | 20 | 1.0 | | | | | 0.5 | | 1.5 | 38.5 | 27.0 | 11.6 |
| 13 | | 20 | 1.0 | | | | | 0 | | 1.5 | 38.8 | 27.1 | 11.7 |
| 14 | | 20 | 1.0 | | | | | 1.0 | | 1.5 | 38.3 | 26.8 | 11.5 |
| C1 | | 0 | 0 | | | | | 0 | | 1.5 | 49.3 | 34.5 | 14.8 |
| C2 | | 0 | 2.0 | | | | | 0 | | 1.5 | 48.3 | 33.8 | 14.5 |
| C3 | | 0 | 0 | | | | | 1.0 | | 1.5 | 48.8 | 34.1 | 14.6 |
| C4 | | 0 | 2.0 | | | | | 1.0 | | 1.5 | 47.8 | 33.4 | 14.3 |
| C5 | | 10 | 1.0 | | | | | 0.5 | | 1.5 | 43.5 | 30.5 | 13.0 |

Examples 4-7

Base Syrup 1 was coated onto PET 1 using a notch bar coater at an approximate thickness of 0.002 inches (51 micrometers). The exposed surface of the syrup was exposed to a total UVA energy of 870 milliJoules/square centimeter in a nitrogen-inerted environment. Compositions 4-7 were then coated on PET 3 and brought together in intimate contact with cured Base Syrup 1 using a two-roll coater having a total gap setting of 0.0065 inches (165 micrometers). The compositions were each cured by exposing the surface of PET3 to a total UVA energy of approximately 1824 milliJoules/square centimeter. Both PET films were then removed to give clear, flexible, multilayer, non-tacky, acrylic film articles.

Examples 8-12 and Comparative Examples C1-C5

Base Syrup 1 was coated between two sheets of PET 1 using a two-roll coating station having a total gap setting of 0.008 inches (203 micrometers). The coated composition was cured by exposing the surface of the PET to a total UVA energy of 1824 milliJoules/square centimeter. After removal of one of the PET 1 films, compositions 8-12 and C1-C5 were coated onto the exposed cured surface of Base Syrup 1 using a #6 Meyer rod and the coated surface exposed a total UVA energy of 2 Joules/square centimeter. The PET 1 film was removed to give clear, flexible, multilayer, non-tacky, acrylic film articles.

Examples 13-14

Examples 13-14 were prepared as described for Examples 8-12 except that the coated composition was exposed to a total UVA energy of 912 milliJoules/square centimeter in a nitrogen inerted environment. The PET 1 film was removed to give clear, flexible, multilayer, non-tacky, acrylic film articles.

The films were evaluated according to the test method previously described. The results were as follows:

TABLE 4

| | Cleaning Results | |
|---|---|---|
| Example | Ink Removal | Paint Removal |
| 4 | Pass | Pass |
| 5 | Pass | Pass |
| 6 | Pass | Fail |
| 7 | Pass | Pass |
| 8 | Fail | Pass |
| 9 | Fail | Pass |
| 10 | Fail | Pass |
| 11 | Pass | Pass |
| 12 | Pass | Pass |
| 13 | Fail | Pass |
| 14 | Pass | Pass |
| C1 | Fail | Fail |
| C2 | Fail | Fail |
| C3 | Fail | Fail |
| C4 | Fail | Fail |
| C5 | Fail | Fail |

NT: Not tested

Example 15

A film of THV 221GZ was provided as follows. THV 221GZ feedstock was extruded at a temperature of 249° C. (480° F.) and a rate of 1.81 kilograms/hour (4 pounds/hour) through a flat film die onto a casting wheel chilled to 21° C. (70° F.) at a speed of approximately 5.5 meters/minute (18 feet/minute) to give a film having a thickness of 50 micrometers (0.002 inches). The resulting film was masked with a discontinuous pattern by plasma chemical vapor deposition of TMS then treated with reactive ion etching using plasma of oxygen gas as described in U.S. Pat. No. 8,634,146 (Comparative Example 9).

Acrylic Base Syrup 4 was prepared by mixing the components and amounts shown in Table 5 below in a 100 milliliter cup using a centrifugal resin mixer (MAX 100 mixing cup and FlackTek Speedmixer DAC 150 FV; both from FlackTek Incorporated, Landrum, S.C.) at 3500 rpm for 3 minutes. The Acrylic Base Syrup 4 was coated between PET1 and the THV221 film using a two-roll coating station having a gap setting that was 0.002 inches (51 micrometers) greater than the combined thickness of the two films. The resulting coated, uncured article was then exposed on both sides using a plurality of fluorescent bulbs having a peak emission wavelength of 365 nanometers to provide a total UV-A energy of 1824 milliJoules/square centimeter. The total UVA energy was determined using a POWERMAP radiometer equipped with low power sensing head (available from EIT Incorporated, Sterling, Va.) at a web speed of about 4.6 meters/minute (15 feet/minute). The radiometer web speed and energy were then used to calculate the total exposure energy at the web speed used during curing of the acrylic composition.

PET1 film was then removed, and the resulting cured laminate structure was then evaluated according to "Test Method 1—Permanent Marker" on the THV221 side of the construction and achieved a rating of "Pass".

TABLE 5

| Base Syrup Formulation 4 | | | | | | | | | | |
|---|---|---|---|---|---|---|---|---|---|---|
| Base Syrup 4 | EHA | IBOA | AA | HEA | CN965 | Irg 819 | B60H | Tin 479 | Tin 928 | Tin 123 |
| Amount parts by weight) | 14.0 | 10.4 | 5.8 | 5.8 | 4.1 | 0.5 | 9.8 | 0.38 | 0.75 | 0.15 |

What is claimed is:

1. A film comprising:
a first film layer comprising a (meth)acrylic polymer and 5 wt. % to 30 wt. % of polyvinyl acetal polymer comprising polymerized units having the following formula

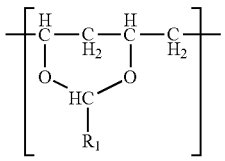

wherein $R_1$ is hydrogen or a C1-C7 alkyl group;
wherein the first film layer comprises 10 to 65 wt-% of polymerized units of polar monomer such that the (meth)acrylic polymer and polyvinyl acetal polymer have a single Tg ranging from 30° C. to 60° C. as measured by Differential Scanning calorimetry; and
a second film layer proximate the first film layer with the proviso that the second layer does not comprise a (meth)acrylic polymer and a polyvinyl acetal resin composition having a Tg less than 30° C.

2. The film of claim 1 wherein the second film layer is not thermoplastic.

3. The film of claim 1 wherein the second film layer has a gel content of at least 20%.

4. The film of claim 1 wherein the second film layer comprises a cured (meth)acrylic polymer and optionally a polyvinyl acetal polymer.

5. The film of claim 4 wherein the cured (meth)acrylic polymer of the second film layer comprises greater than 10 wt-% polymerized units of a multifunctional (meth)acrylate monomer or oligomer.

6. The film of claim 4 wherein the cured (meth)acrylic polymer of the second film layer comprises at least one monomer, oligomer, or polymer comprising a free radically polymerizable silicone group or a free radically polymerizable fluorine group.

7. The film of claim 1 wherein the second film layer has a Tg no greater than 60° C.

8. The film of claim 1 wherein the second film layer has a Tg greater than 60° C.

9. The film of claim 1 wherein the first film layer and/or second film layer comprises a pigment, colorant, decorative additive, or a combination thereof.

10. The film of claim 1 wherein the first film layer and second film layer has a tensile elastic modulus of at least 1 MPa at 25° C. and 1 hertz.

11. The film of claim 1 wherein the first film layer and/or second film layer comprises 10 to 85 wt-% of polymerized units of monofunctional alkyl (meth)acrylate monomer having a Tg of less than 0° C.

12. The film of claim 11 wherein the monofunctional alkyl (meth)acrylate monomer has a Tg of less than −40° C.

13. The film of claim 1 wherein the second film layer comprises polyvinyl butyral polymer.

14. The film of claim 1 wherein the first film layer comprises photoinitiator.

15. The film of claim 1 wherein the film or second film layer further comprises a backing selected from polymeric films, woven or nonwoven fabrics, metal foils, paper, foams, and combinations thereof.

16. The film of claim 15 wherein the backing comprises a thermoplastic polymer that is selected from polycarbonate, polyethylene terephthalate, polyamide, polyethylene, polypropylene, polystyrene polyvinyl chloride, poly(meth)acrylic polymer, and ABS (acrylonitrile-butadiene-styrene copolymer).

17. The film of claim 1 wherein the first film layer further comprises a metal or metal oxide layer.

18. The film of claim 1 further comprising a cover film or the second film layer is a cover film and the cover film is selected from fluoropolymer, polycarbonate, polyethylene terephthalate, polyamide, polyethylene, polypropylene, polystyrene polyvinyl chloride, poly(meth)acrylic polymer, and ABS (acrylonitrile-butadiene-styrene copolymer).

19. The film of claim 1 wherein the film comprises no greater than 25 wt-% of inorganic oxide materials.

20. The film of claim 1 wherein the (meth)acrylic polymer of the first film layer is a random polymer.

* * * * *